Aug. 13, 1940.    S. SCHNELL ET AL    2,211,439
RESILIENT BRAKE SHOE GUIDE
Filed June 14, 1939
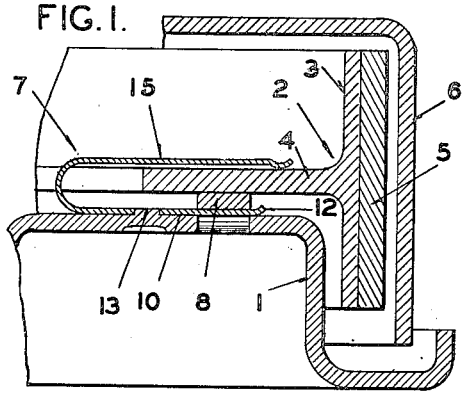
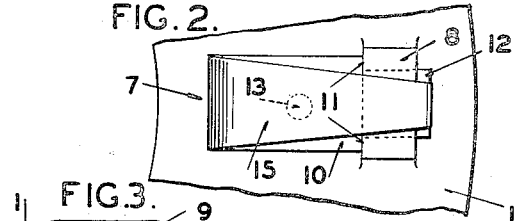
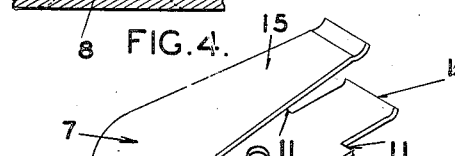
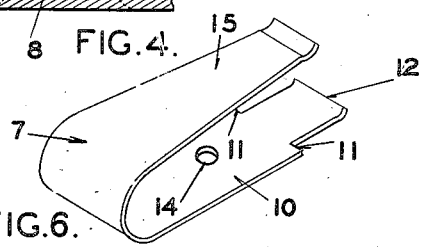
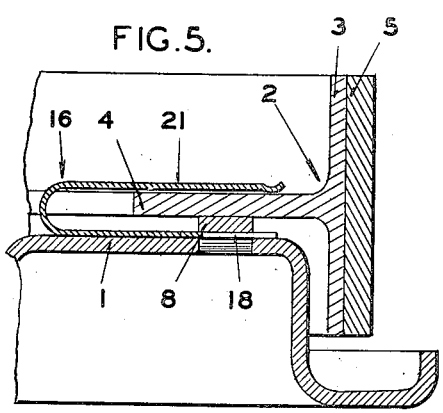
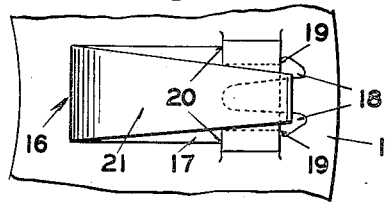
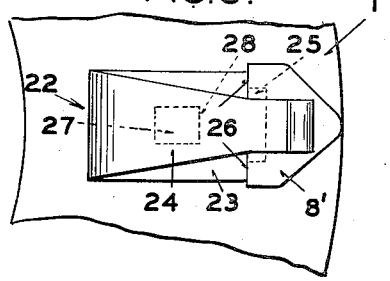
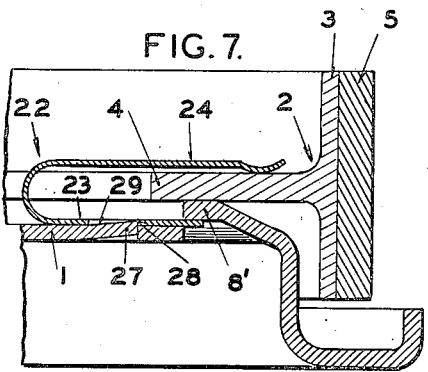
INVENTORS
STEVE SCHNELL
WERNER F. BOLDT.
BY
*E. E. Huffman*
ATTORNEY Patented Aug. 13, 1940

2,211,439

UNITED STATES PATENT OFFICE 2,211,439

RESILIENT BRAKE SHOE GUIDE

Steve Schnell, Overland, and Werner F. Boldt, Clayton, Mo., assignors to Wagner Electric Corporation, St. Louis, Mo., a corporation of Delaware Application June 14, 1939, Serial No. 279,100

17 Claims. (Cl. 188—78)

Our invention relates to guides and more particularly to resilient guides for cooperation with a movable element, such as a brake shoe, to hold it in proper positon and prevent its rattling.

One of the objects of our invention is to provide an improved resilient guide which can be readily attached and detached from a support.

Another object of our invention is to provide a "snap-on" resilient guide for a brake shoe which is so constructed that it can be attached to the backing plate by means of deformed portions of the backing plate.

Other objects of our invention will become apparent from the following description taken in connection with the accompanying drawing in which Figure 1 is a cross-sectional view of a backing plate and a brake shoe showing our improved guide associated therewith; Figure 2 is a front view with the brake shoe removed; Figure 3 is a view of the attaching slot formed on the backing plate; Figure 4 is a perspective view of the guide with the legs of the spring pried open; Figures 5 and 6 are views similar to Figures 1 and 2 showing a modified construction; and Figures 7 and 8 are also views similar to Figures 1 and 2 showing an additional modified construction.

Referring to Figures 1, 2, 3, and 4, numeral 1 indicates a backing plate or support for a brake shoe 2 having a lining carrying flange 3 and a web 4. The flange 3 carries a lining 5 for engagement with the drum 6 when the shoe is moved outwardly toward the drum by any suitable well-known actuating means (not shown).

In accordance with our invention, there is provided a U-shaped guide 7 made of a leaf spring and carried by the backing plate for guiding the shoe in its movement toward and away from the drum and to also resiliently hold the shoe relative to the backing plate to prevent the shoe from rattling. In order that the guide may be detachably mounted on the backing plate, a portion 8 is partially sheared from the backing plate and deformed inwardly therefrom to form a slot 9 for receiving the inner leg 10 of the U-shaped guide. The end portion of the leg which is adapted to extend into the slot is reduced in width to form shoulders 11 for engagement with the portion 8 of the backing plate and limit the extent the leg can be inserted in the slot. Also the extreme end 12 of leg 10 is turned inwardly in order to facilitate the insertion of the reduced portion through the slot. The leg 10 is maintained in the slot by means of a projection 13 on the backing plate which fits into an opening 14 in the leg when the guide is properly mounted on the backing plate. The projection 13 is preferably formed by deforming the backing plate as indicated. The outer leg 15 of the U-shaped guide engages the web 4 of the shoe and forces the web into engagement with the deformed portion 8 of the backing plate, this portion acting as a steady rest for the shoe and also a surface upon which the web of the shoe can slide.

The U-shaped guide is mounted on the backing plate by first inserting the reduced end of the leg 10 beneath the deformed portion 8 and then forcing the turned up portion 12 to a point beyond the deformed portion. This will swing leg 10 toward the backing plate and when shoulder 11 engages the portion 8, the hole 14 will receive the projection 13 and the guide will "snap" into its operative position. With the projection 13 in the hole, the leg 10 cannot be withdrawn from the slot unless this leg is first pried away from the backing plate to thus disengage the projection 13 from the opening 14.

When the guide is mounted on the backing plate and associated with a brake shoe in the manner shown, the brake shoe will be prevented from rattling when not in engagement with the drum. When the shoe is in engagement with the drum, the leg 15 will yield to permit the shoe to follow the contour of the drum during the braking action. Also, by having the guide detachably carried by the backing plate, it may be removed to facilitate the removal of the shoe from the backing plate. It is also to be noted that shoulders 11 on the attaching leg 10 not only act as a stop for properly inserting the reduced portion of the leg in the slot but also close any opening in the backing plate at this point, thus keeping out dirt and dust from the brake which might otherwise enter the braking assembly.

In the modified construction shown in Figures 5 and 6, the U-shaped guide 16 is similar to guide 7 previously described but is maintained against removal from the backing plate by different means. The attaching inner leg 17 is provided with a reduced forked end formed by prongs 18 upon which are formed shoulders 19 which engage the edge of the deformed portion 8 of the backing plate when the guide is in operative position. Shoulders 20 on leg 17 limit the extent of insertion of this leg in the slot. The outer leg 21 of the guide cooperates with web 4 of the shoe to hold it in engagement with the portion 8.

To mount the guide on the backing plate all that is necessary is to insert the prongs 18 in the slot formed by the deformed portion 8 to a point where the shoulders 20 engage the deformed portion 8. The shoulders 19 on the prongs will now "snap" into place behind the portion 8. To remove the guide it is necessary to first remove shoe 4 and then force the prongs 18 toward each other sufficiently to disengage the shoulders 19 and permit leg 17 to be pulled out of the slot.

In the modified construction shown in Figures 7 and 8, the U-shaped guide 22 has an inner attaching leg 23 and an outer leg 24 for cooperation with web 4 of the shoe. The attaching leg adjacent its end is formed with a reduced end 25 providing shoulders 26. The backing plate 1 has a deformed portion 8' for forming the slot which receives the reduced portion 25 when the guide is in operative position. The backing plate also has a struck-out portion 27 forming an abutment for cooperation with a surface 28 formed by cutting an opening 29 in the body of the leg 23 of the guide.

The guide is mounted in position on the backing plate by first inserting the reduced portion 25 into the slot to a point where shoulders 26 engage portion 8'. This will permit the struck-out portion 27 to be received in the opening 29 in leg 23 and allow surface 28 to abut the struck-out portion. In this construction leg 24 of the guide is of such length as to engage web 4 at a point closer to the lining than the point at which the web engages the deformed portion 8'. A force will thus be created when the guide is in operative position which tends to turn the guide toward the backing plate and thus maintain the leg 23 against the backing plate and the reduced end in the slot. The guide may be removed when the shoe is in position by merely prying leg 23 away from the backing plate and to a position where the surface 28 will be free to move past the struck out portion 27.

Being aware of the possibility of other modifications in the particular structure herein described without departing from the fundamental principles of our invention, we do not intend that its scope be limited except as set forth by the appended claims.

Having fully described our invention, what we claim as new and desire to secure by Letters Patent of the United States is:

1. In apparatus of the class described, a support provided with a slot parallel with the surface thereof, a movable member adjacent the support, a U-shaped leaf spring having one leg engaging the member for forcing it toward the support and the other leg extending into the slot, and disengageable abutment means on the support and the leaf spring for preventing the leg from being removed from the slot.

2. In apparatus of the class described, a support provided with a slot, a movable member adjacent the support, a U-shaped leaf spring having one leg engaging the member for forcing it toward the support and the other leg extending into the slot, and cooperating abutments on the support and the leaf spring for preventing the leg from being removed from the slot, said abutments being disengageable by movement of the leg away from the support.

3. In apparatus of the class described, a support provided with a slot, a movable member adjacent the support, a U-shaped leaf spring guide for receiving a portion of the movable member and resiliently forcing it toward the support, and means for detachably mounting said guide on the support by means of one of its legs, said means permitting the guide to be removed by a flexing of the leg.

4. In apparatus of the class described, a support provided with a slot, a movable member adjacent the support, a U-shaped leaf spring guide for receiving a portion of the movable member and resiliently forcing it toward the support, and means detachably mounting said guide on the support by means of one of its legs and comprising cooperating abutments, said abutments being disengageable by a flexing of the leg to thereby permit the guide to be removed from the support.

5. In apparatus of the class described, a support, a movable member, and a resilient guide carried by the support for resilienly holding and guiding the member, said guide comprising a U-shaped leaf spring having one of its legs cooperating with the member to force it toward the support and means for securing the other leg to the support and comprising means forming a slot substantially parallel to the surface of the support for receiving the leg and detachable cooperating means on the leg and support for maintaining the leg in the slot.

6. In braking apparatus, a backing plate having a deformed portion providing a slot, a brake shoe, a U-shaped leaf spring having one leg engaging a portion of the shoe and biasing it against the deformed portion and its other leg positioned in said slot, and disengageable cooperating abutments on the last named leg and the backing plate for preventing withdrawal of the leg from the slot.

7. In braking apparatus, a backing plate provided with a slot parallel with the plate surface, a brake shoe having a web portion, a detachable U-shaped guide having one leg engaging the web of the shoe for holding the shoe in engagement with the plate and its other leg positioned in said slot, and disengageable cooperating means on the last named leg and the backing plate for preventing withdrawal of the leg from the slot when the guide is in operative position.

8. In braking apparatus, a backing plate having a deformed portion providing a slot, a brake shoe, a U-shaped leaf spring having one leg engaging a portion of the shoe and biasing it against the deformed portion and its other leg positioned in said slot, said last named leg also being provided with an opening, and a projection carried by the backing plate and positioned in said opening when the U-shaped spring is in operative position, said spring being detachable from the backing plate by a movement of the leg away from the backing plate to remove the projection from the opening and then by a subsequent movement withdrawing the leg from the slot.

9. In braking apparatus, a backing plate having a slot parallel with the surface of the plate, a brake shoe, a U-shaped leaf spring having one leg engaging a portion of the shoe and biasing it against the backing plate and its other leg positioned in said slot, said last named leg being provided with an opening, and a projection formed integrally with the backing plate and positioned in said opening and preventing the last named leg from being withdrawn from the slot.

10. In braking apparatus, a backing plate having a slot parallel with the surface of the plate, a brake shoe, a U-shaped leaf spring having one leg engaging a portion of the shoe and biasing it against the backing plate and its other leg positioned in said slot, said last named leg being provided with stops for limiting the extent of movement of the leg into the slot, and means forming abutments on said leg for cooperation with the deformed portion to prevent removal of the leg from the slot.

11. In braking apparatus, a backing plate having a deformed portion providing a slot, a brake shoe, a U-shaped leaf spring having one leg engaging a portion of the shoe and biasing it against the deformed portion of the backing plate and its other leg positioned in said slot, said last named leg being provided with stops for limiting the extent of movement of the leg into the slot and the outer end of said leg being provided with resilient projections having abutments thereon for engagement with the deformed portion to thereby prevent withdrawal of the leg from the slot.

12. In braking apparatus, a backing plate having a deformed portion providing a slot, a brake shoe, a U-shaped leaf spring having one leg engaging a portion of the shoe and biasing it against the deformed portion and its other leg positioned in said slot, said first named leg being of such length as to engage the shoe at a point closer to the lining carrying portion than the point at which the shoe engages the deformed portion, and means forming an abutment surface on the body of the shorter leg and an integral abutment surface on the backing plate for cooperation with the first named abutment surface to prevent withdrawal of the leg from the slot.

13. A detachable resilient guide for mounting on a support comprising a U-shaped leaf spring for receiving the member to be guided and permitting it to move relatively to the support by flexing the spring, said guide having one leg provided with a reduced portion for extending into a slot of the support and with an abutment surface for cooperation with another abutment surface on the support to prevent the reduced portion from being withdrawn from the slot.

14. A detachable resilient guide for mounting on a support comprising a U-shaped leaf spring for receiving the member to be guided and permitting it to move relatively to the support by flexing the spring, said guide having one leg provided with a reduced end portion for extending into a slot of the support and with an opening in the body of the leg for receiving an abutment to prevent the reduced portion from being withdrawn from the slot.

15. A detachable resilient guide for mounting on a support comprising a U-shaped leaf spring having one leg provided with a forked end portion for extending into a slot of the support and with abutments on each portion forming the forked end for cooperation with a portion of the support to prevent the said end portion from being withdrawn from the slot.

16. A detachable resilient brake shoe guide comprising a U-shaped leaf spring for receiving a portion of a brake shoe and permitting it to have movement by flexing the spring, said spring having one leg provided with a reduced end portion forming shoulders on the sides of the body of the leg and with an opening in said body between the reduced portion and the turned portion of the spring.

17. A detachable resilient guide for mounting on a support provided with a slot parallel to the surface of the support and comprising a U-shaped leaf spring for receiving between its legs the member to be guided, one of said legs being a pressure producing leg for resiliently holding the guided member against the support and the other an attaching leg for reception in the slot, the outer end of said attaching leg being turned inwardly toward the other leg and the body of said attaching leg being provided with an abutment receiving opening.

STEVE SCHNELL.
WERNER F. BOLDT.